United States Patent
Jeong et al.

(10) Patent No.: US 9,450,256 B2
(45) Date of Patent: Sep. 20, 2016

(54) ACTIVE THERMAL MANAGEMENT SYSTEM FOR FUEL CELL STACK

(71) Applicant: Hyundai Motor Company, Seoul (KR)

(72) Inventors: Hee Seok Jeong, Seoul (KR); Sung Ho Lee, Seongnam-Si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 146 days.

(21) Appl. No.: 13/860,340

(22) Filed: Apr. 10, 2013

(65) Prior Publication Data

US 2014/0178784 A1   Jun. 26, 2014

(30) Foreign Application Priority Data

Dec. 24, 2012 (KR) .................. 10-2012-0151910

(51) Int. Cl.
*H01M 8/04* (2016.01)
*H01M 8/02* (2016.01)

(52) U.S. Cl.
CPC ..... *H01M 8/04074* (2013.01); *H01M 8/04029* (2013.01); *H01M 8/0432* (2013.01); *H01M 8/04067* (2013.01); *H01M 8/04768* (2013.01); *H01M 8/0267* (2013.01); *H01M 8/04268* (2013.01); *H01M 2250/20* (2013.01); *Y02E 60/50* (2013.01); *Y02T 90/32* (2013.01)

(58) Field of Classification Search
CPC ...... H01M 8/04; H01M 8/10; H01M 8/0267; H01M 8/04268; H01M 8/04007; H01M 8/04067; H01M 8/04074; H01M 8/04029; H01M 8/04768
USPC ................................. 429/450, 434
See application file for complete search history.

(56) References Cited

U.S. PATENT DOCUMENTS

2011/0262791 A1* 10/2011 Im ............... H01M 2/1077
429/120
2011/0269043 A1* 11/2011 Hood .............. H01M 8/04014
429/439

FOREIGN PATENT DOCUMENTS

| JP | 2004-288509 A | 10/2004 | |
| JP | 2007-323993 | * 12/2007 | ............. H01M 8/04 |
| JP | 2007-323993 A | 12/2007 | |

(Continued)

OTHER PUBLICATIONS

Syed Mushahid Hussain Hashmi, "Cooling strategies for PEM FC Stacks", (2010), M. Sc. Dissertation, Chapter 6, 91-93.*

(Continued)

*Primary Examiner* — Patrick Ryan
*Assistant Examiner* — Kiran Akhtar
(74) *Attorney, Agent, or Firm* — McDermott Will & Emery LLP

(57) ABSTRACT

An active thermal management system for a fuel cell stack controls the distribution of coolant flow for each unit cell of the fuel cell stack based on the temperature distribution measured at unit cells of the fuel cell stack. A coolant distribution means is capable of controlling the distribution of coolant flow for different sets of unit cells. The coolant distribution means is disposed in a coolant inlet manifold, and controls the coolant flow based on the temperature distribution measured at different unit cells of the fuel cell stack so as to reduce temperature variation in the unit cells, thus improving the performance and durability of the fuel cell stack.

4 Claims, 4 Drawing Sheets

(56) References Cited

FOREIGN PATENT DOCUMENTS

| | | | | |
|---|---|---|---|---|
| JP | 2008-103154 | | 5/2008 | |
| JP | 2008-103514 | * | 5/2008 | ............ H01M 8/04 |
| JP | 2010-282905 | | 12/2010 | |
| KR | 1020060044904 | | 5/2006 | |
| KR | 1020090006789 | | 1/2009 | |

OTHER PUBLICATIONS

Machine translated IDS Reference JP-2007323993A, Oct. 16, 2014.*

English Translation of JP2007-323993.*

English Translation of JP2008-103514.*

* cited by examiner

ACTIVE THERMAL MANAGEMENT SYSTEM FOR FUEL CELL STACK

CROSS-REFERENCE TO RELATED APPLICATION

This application claims the benefit under 35 U.S.C. §119(a) of Korean Patent Application No. 10-2012-0151910 filed Dec. 24, 2012, the entire contents of which are incorporated herein by reference.

BACKGROUND (a) Technical Field

The present invention relates to an active thermal management system for a fuel cell stack. More particularly, the present invention relates to an active thermal management system for a fuel cell stack, which controls the distribution of coolant flow for each unit cell based on the temperature distribution measured at unit cells of the fuel cell stack.

(b) Background Art

A fuel cell system mounted in a fuel cell vehicle includes a fuel cell stack for generating electricity by electrochemical reaction of hydrogen and oxygen, a hydrogen supply system for supplying hydrogen as a fuel to the fuel cell stack, an oxygen (air) supply system for supplying oxygen-containing air as an oxidant required for the electrochemical reaction in the fuel cell stack, and a thermal management system (TMS) for removing reaction heat from the fuel cell stack to the outside of the fuel cell system, controlling operation temperature of the fuel cell stack, and performing a water management function.

The thermal management system forms a cooling loop or a heating loop used to circulate coolant based on the temperature of the fuel cell stack.

That is, the thermal management system forms a cooling loop for pumping/circulating low temperature coolant from a radiator to the fuel cell stack during high-temperature operation of the fuel cell stack, and forms a heating loop for pumping/circulating the hot coolant discharged from the fuel cell stack back to the fuel cell stack in order to heat the fuel cell stack during a cold start-up, for example.

As shown in FIG. 1, the coolant circulated by the cooling loop or heating loop is supplied to a coolant inlet manifold 14 of a fuel cell stack 10 to cool unit cells 12 which constitute the fuel cell stack 10, and is then discharged through a coolant outlet manifold 16.

However, temperature variations can occur due to various conditions in the fuel cell stack in which more than several hundreds of unit cells are stacked, and the temperature variations cannot be solved only by uniform distribution of coolant.

For example, referring to the graph of FIG. 2 showing a temperature gradient over the unit cells of the fuel cell stack, there is a temperature gradient within the unit cells located at both ends of the fuel cell stack which are in contact with end plates, and the temperature gradient within the unit cells located in the middle of the fuel cell stack. Further, the temperature gradient in the fuel cells located in the middle of the fuel cell stack is smaller than that of the unit cells at the both ends of the fuel cell stack. For this reason, it is difficult to solve the temperature gradient over the whole unit cells using a uniform distribution of coolant.

As such, there is a temperature variation in the unit cells of the fuel cell stack, and increased temperature variation deteriorates the performance and durability of the fuel cell stack, which is very problematic.

The above information discussed in this Background section is only for enhancement of understanding of the background of the invention and therefore it may contain information that does not form the prior art that is already known to persons of ordinary skill in the art.

SUMMARY OF THE DISCLOSURE

The present invention provides an active thermal management system for a fuel cell stack, in which a coolant distribution means capable of controlling the distribution of coolant flow towards different sets of unit cells is provided in a coolant inlet manifold. The degree of opening of the coolant distribution means is controlled based on a temperature distribution measured at unit cells of the fuel cell stack so as to reduce temperature variation in the unit cells, thus improving the performance and durability of the fuel cell stack.

In one aspect, the present invention provides an active thermal management system for a fuel cell stack, the system including: a plurality of distribution plates disposed in a coolant inlet manifold of the fuel cell stack and guiding a flow of coolant toward selected unit cells of a plurality of unit cells; a plurality of thermocouples, each disposed in a corresponding unit cell selected from the plurality of unit cells, measure the temperatures of the corresponding unit cells; a coolant distribution means disposed in the coolant inlet manifold or in a manifold interface, connected to the coolant inlet manifold, and configured to controllably distribute the flow of coolant differently to each of a plurality of coolant distribution spaces separated by the distribution plates; and a controller controlling a degree of opening of the coolant distribution means based on measurement values of the thermocouples to control the distribution of flow of coolant to teach of the plurality of coolant distribution spaces.

In an exemplary embodiment, the coolant distribution means includes a plurality of guide plates disposed in the manifold interface, wherein each guide plate of the plurality is connected to a corresponding distribution plate in the coolant inlet manifold, and a plurality of flow control valves, wherein each flow control valve is disposed in a corresponding coolant guide space separated by the guide plates, and wherein the degree of opening of each flow control valve is controlled by the controller.

In another exemplary embodiment, the coolant distribution means includes an actuator disposed in a position where the coolant inlet manifold and the manifold interface are connected and a vane angularly rotatably mounted on the actuator to control the opening and closing of one of the coolant distribution spaces separated by the distribution plates.

In still another exemplary embodiment, the distribution plates disposed in the coolant manifold include a first distribution plate extending up to the unit cells at an inlet side of the fuel cell stack and a second distribution plate extending further than the unit cells in the middle of the fuel cell stack and extending up to the unit cells at the side of the fuel cell stack opposite to the inlet of the fuel cell stack.

In yet another exemplary embodiment, a first coolant distribution space for guiding the coolant toward the unit cells at the inlet side of the fuel cell stack is created between an inner bottom surface of the coolant inlet manifold and the first distribution plate, a second coolant distribution space for guiding the coolant toward the unit cells in the middle of the fuel cell stack is created between the first distribution plate and the second distribution plate, and a third coolant distribution space for guiding the coolant toward the unit cells at the side of the fuel cell stack opposite to the inlet of the fuel cell stack is created between the second distribution plate and the upper surface of the coolant inlet manifold.

In still yet another exemplary embodiment, each thermocouple is connected to a thermocouple well connected to the corresponding unit cell of the fuel cell stack, and the thermocouples are provided more densely among the unit cells at the inlet side of the fuel cell stack and among the unit cells at the side of the fuel cell stack opposite to the inlet of the fuel cell stack than among the unit cells in the middle of the fuel cell stack.

In a further exemplary embodiment, the controller performs coolant distribution control for controlling the degree of opening of the coolant distribution means, and the coolant distribution control is repeated in a feedback manner until a temperature gradient over the unit cells of the fuel cell stack is within a predetermined variation.

Other aspects and exemplary embodiments of the invention are discussed infra.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered sources of power.

The above and other features of the invention are discussed infra.

BRIEF DESCRIPTION OF THE DRAWINGS

The above and other features of the present invention will now be described in detail with reference to certain illustrative embodiments thereof shown in the accompanying drawings. The illustrate embodiments are discussed by way of illustration only, and thus are not limitative of the present invention.

Figure 1:
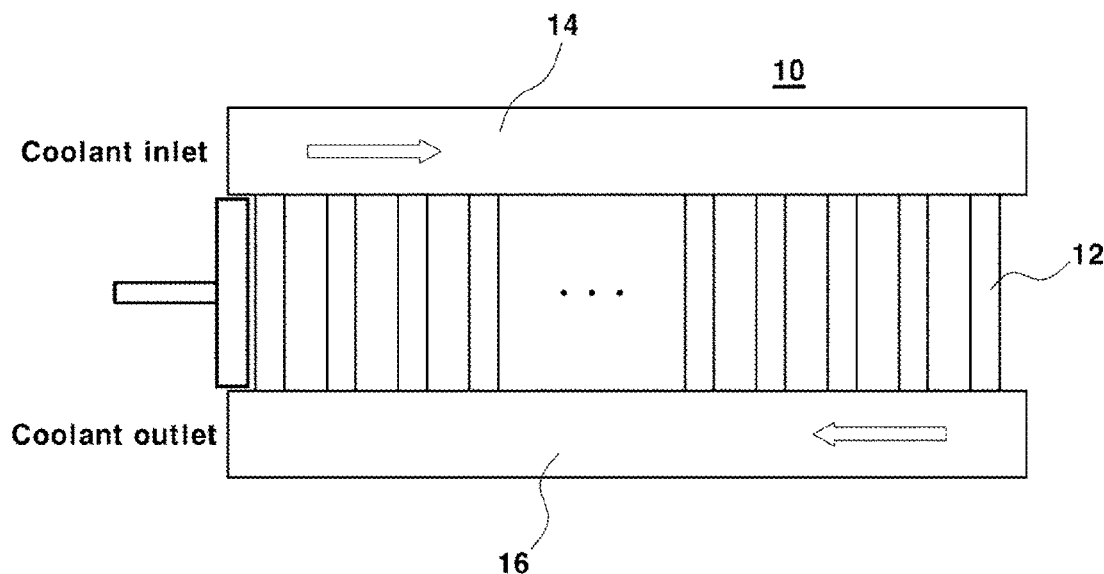
FIG. 1 is a schematic diagram showing a coolant circulation path of a fuel cell stack.
Figure 2:
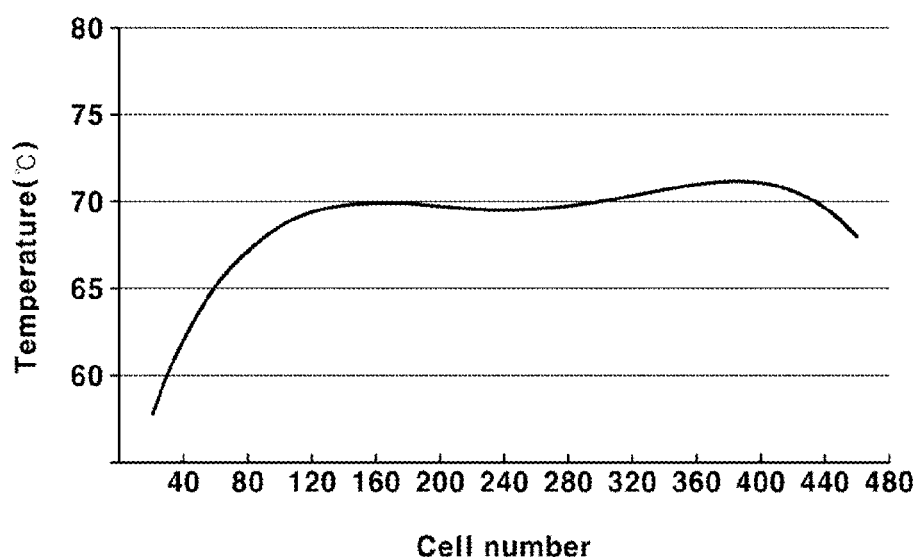
FIG. 2 is a graph showing a temperature gradient according to the position of units cells in the fuel cell stack.

Reference numerals set forth in the Drawings includes reference to the following elements as further discussed below:

10: fuel cell stack
12: unit cell
14: coolant inlet manifold
16: coolant outlet manifold
14a: first coolant distribution space -continued 14b: second coolant distribution space
14c: third coolant distribution space
18: distribution plate(s)
18a: first distribution plate
18b: second distribution plate
20: thermocouple
22: thermocouple well
24: controller
26: flow control valve
28: manifold interface
29: guide plate
30: vane
32: actuator It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, the same reference numbers refer to the same or equivalent parts of the present invention throughout the several drawings.

DETAILED DESCRIPTION

Reference is now made to various embodiments of the present invention, examples of which are illustrated in the accompanying drawings and described below. While the invention will be described in conjunction with exemplary embodiments, it will be understood that the present description is not intended to limit the scope of the invention to those exemplary embodiments. On the contrary, the invention is intended to cover not only the exemplary embodiments described herein, but also various alternatives, modifications, equivalents and other embodiments, which may be included within the spirit and scope of the invention as defined by the appended claims.

The present invention aims at providing an active thermal management system for a fuel cell stack, which controls the distribution of coolant flow for each unit cell in the fuel cell stack based on the temperature distribution measured at unit cells of the fuel cell stack.

Figure 3:
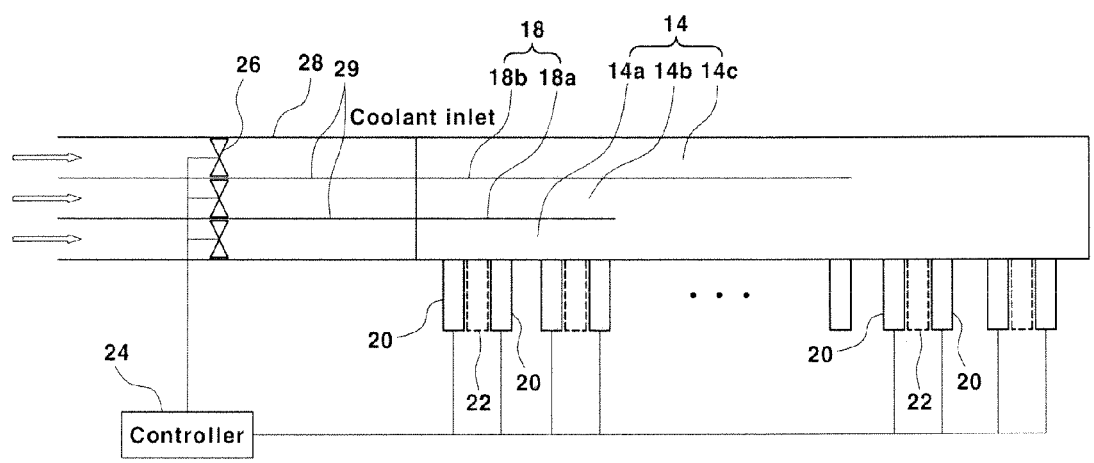
FIG. 3 is a schematic diagram showing an active thermal management system for a fuel cell stack in accordance with an exemplary embodiment of the present invention.
Figure 4:
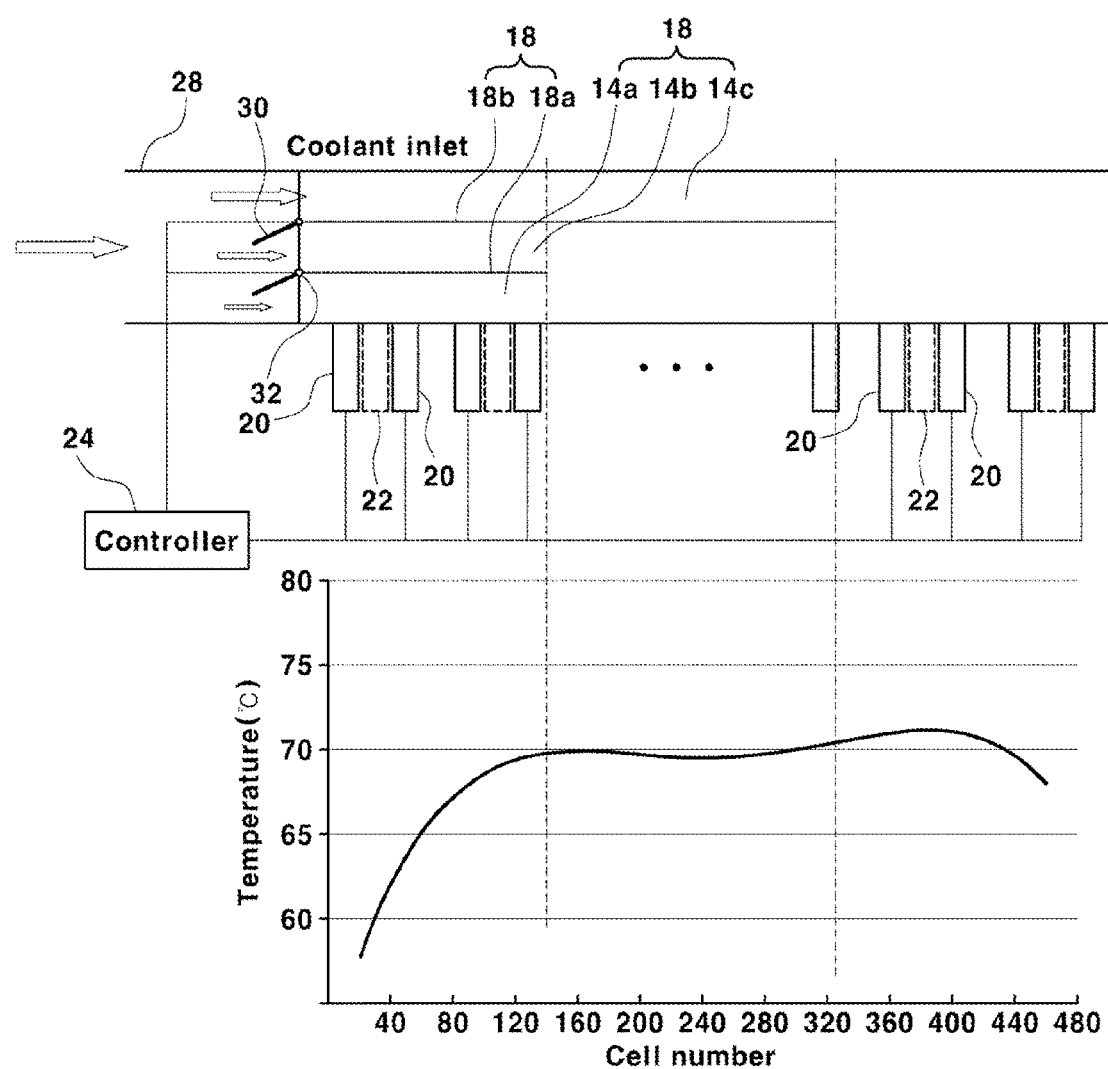
FIG. 4 is a schematic diagram showing an active thermal management system for a fuel cell stack in accordance with another exemplary embodiment of the present invention.
Figure 5:
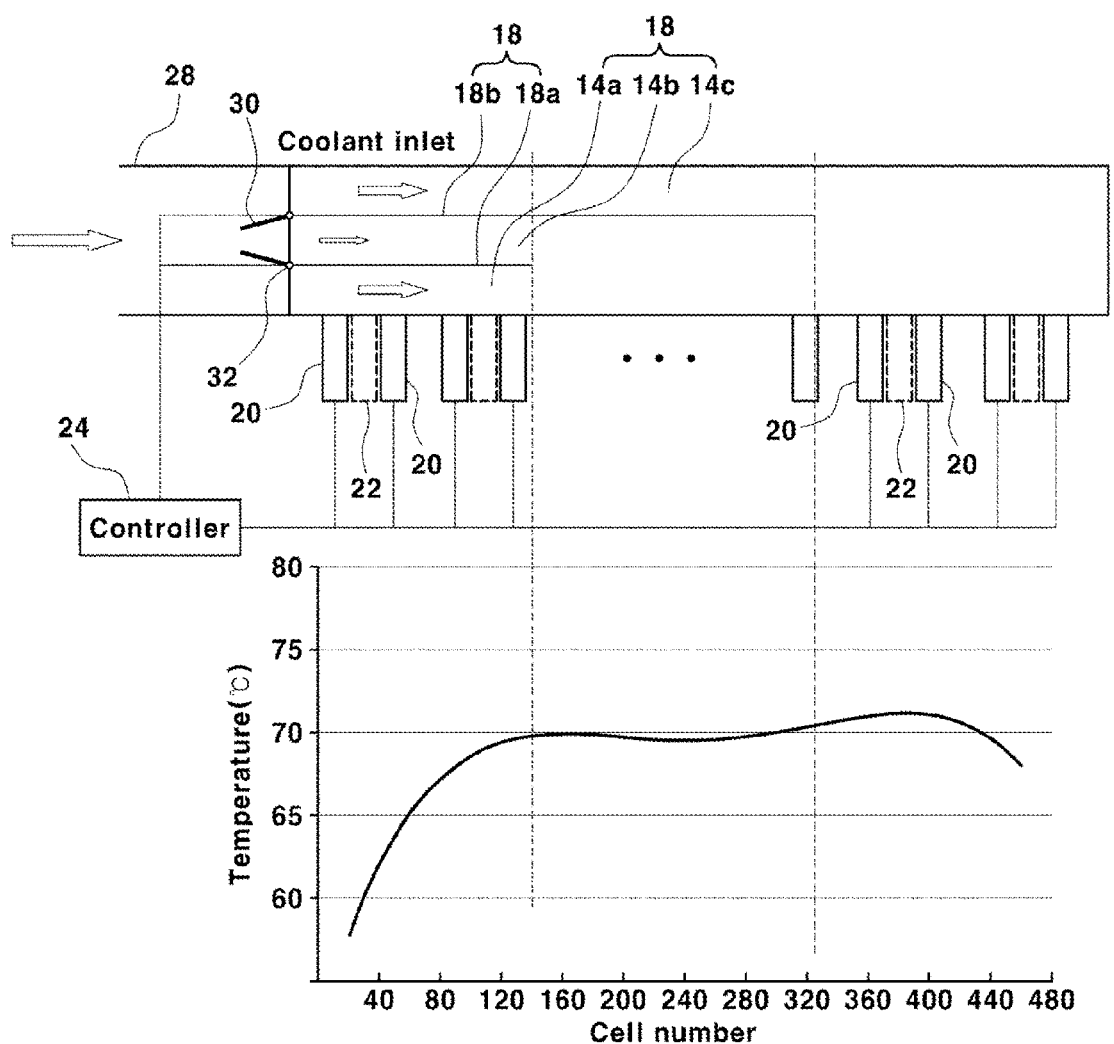
FIG. 5 is a schematic diagram showing an active thermal management system for a fuel cell stack in accordance with still another exemplary embodiment of the present invention.

To this end, as shown in FIGS. 3 to 5, a plurality of distribution plates 18 are integrally disposed in a coolant inlet manifold 14 of a fuel cell stack in the longitudinal direction, and the plurality of distribution plates 18 serve to guide the flow of coolant toward unit cells selected from a plurality of unit cells.

Here, the plurality of distribution plates 18 integrally disposed in the coolant inlet manifold 14 include a first distribution plate 18a extending up to the unit cells at an inlet side of the fuel cell stack and a second distribution plate 18b extending further than the unit cells in the middle of the fuel cell stack and up to the unit cells at a side of the fuel cell stack opposite to the inlet of the fuel cell stack.

Accordingly, a first coolant distribution space 14a for guiding the coolant toward the unit cells at the inlet side of the fuel cell stack is created between the inner bottom surface of the coolant inlet manifold 14 and the first distribution plate 18a, a second coolant distribution space 14b for guiding the coolant toward the unit cells in the middle of the fuel cell stack is created between the first distribution plate 18a and the second distribution plate 18b, and a third coolant distribution space 14c for guiding the coolant toward the unit cells at the side of the fuel cell stack opposite to the inlet of the fuel cell stack is created between the second distribution plate 18b and the upper side surface of the coolant inlet manifold 14.

Each of the first, second, and third coolant distribution spaces 14a, 14b, and 14c generally have the same cross-sectional area, in which the first coolant distribution space 14a, which guides the coolant toward the unit cells at the inlet side of the fuel cell stack, has the shortest path for coolant flow, and the third coolant distribution space 14c, which guides the coolant toward the unit cells at the side of the fuel cell stack opposite to the inlet of the fuel cell stack, has the longest coolant path. In other examples, however, different coolant distribution spaces 14a, 14b, and 14c may have different cross-sectional areas.

A thermocouple 20 is disposed in each of the unit cells of the fuel cell stack to control the distribution of coolant flow through each respective unit cell based on the temperature distribution measured at the unit cells of the fuel cell stack. Preferably, each thermocouple 20 is fixedly connected to a thermocouple well 22 connected to each unit cell of the fuel cell stack.

In particular, although the thermocouples 20 may be provided in all of the unit cells of the fuel cell stack in some examples, in other examples a single thermocouple 20 may be disposed in and shared between a group of a predetermined number of unit cells to measure the temperature distribution of the group of unit cells of the fuel cell stack.

Alternatively, the thermocouples 20 may be provided more densely among the unit cells at the inlet side of the fuel cell stack and among the unit cells at the side of the fuel cell stack opposite to the inlet of the fuel cell stack (i.e., at each end of the fuel cell stack). For example, the thermocouples 20 may be provided more densely among unit cells that have a temperature gradient greater than the gradient of the unit cells in the middle of the fuel cell stack, so as to more accurately measure the temperature distribution in the unit cells at the inlet side of the fuel cell stack and the unit cells at the side of the fuel cell stack opposite to the inlet of the fuel cell stack, i.e. in the units cells that have a large temperature gradient.

A coolant distribution means, which distributes the coolant flow differently to each of the first, second, and third coolant distribution spaces 14a, 14b, and 14c divided by the first and second distribution plates 18a and 18b, is disposed in the coolant inlet manifold 14 or in a manifold interface 28 connected to the coolant inlet manifold 14.

The coolant distribution means is controlled by a controller 24 for controlling the opening degree of the coolant distribution means based on the measurement values of the thermocouples 20.

As shown in FIG. 3, a coolant distribution means in accordance with an exemplary embodiment of the present invention consists of one or more guide plate(s) 29, which is/are connected to each of the first and second distribution plates 18a and 18b in the coolant inlet manifold 14 and disposed in the manifold interface 28, and one or more flow control valve(s) 26, which is/are disposed in each of coolant guide spaces divided by the guide plate(s) 29, and whose opening degree is controlled by the controller 24.

In more detail in the illustrated example, each of a pair of guide plates 29 is disposed in the manifold interface 28 and is integrally connected in a straight line to a corresponding one of the first and second distribution plates 18a and 18b in the coolant inlet manifold 14, and thus the internal space of the manifold interface 28 is divided into three coolant guide spaces by the pair of guide plates 29. Moreover, the flow control valve(s) 26 whose opening degree is/are controlled by the controller 24 is/are disposed in each of the coolant distribution spaces 14a and 14c, and can individually control the flow of coolant in each of the coolant distribution spaces 14a to 14c.

Accordingly, when temperature distribution data detected by the thermocouples 20 at the unit cells of the fuel cell stack is transmitted to the controller 24, the controller 24 controls the opening angle of each of the flow control valve(s) 26 such that coolant flow is distributed differently to each of the first, second, and third coolant distribution spaces 14a to 14c in the coolant inlet manifold 14, thus controlling the distribution of coolant flow differently toward the unit cells at the inlet side of the fuel cell stack, the unit cells at the side of the fuel cell stack opposite to the inlet of the fuel cell stack, and the unit cell in the middle of the fuel cell stack.

For example, the coolant distribution control is performed in such a manner that the opening angle of each of the flow control valve(s) 26 is controlled to increase the coolant flow toward the unit cells at the inlet side of the fuel cell stack and the unit cells at the side of the fuel cell stack opposite to the inlet of the fuel cell stack, i.e. the unit cells that have large temperature gradients, and to reduce the coolant flow toward the unit cells in the middle of the fuel cell stack, which have lower temperature gradients. The coolant distribution control is repeated in a feedback manner (e.g., continuous feedback) until the temperature gradient over the whole set of unit cells of the fuel cell stack is within a predetermined variation.

As shown in FIGS. 4 and 5, a coolant distribution means in accordance with another exemplary embodiment of the present invention consists of one or more actuator(s) 32 mounted in a position where the coolant inlet manifold 14 and the manifold interface 28 are connected and a vane 30 angularly rotatably mounted on a drive shaft of each actuator 32.

Accordingly, when temperature distribution data detected by the thermocouples 20 at the unit cells of the fuel cell stack is transmitted to the controller 24, the controller 24 transmits a driving signal to the actuator(s) 32, and then the opening angle of each vane 30 is controlled by the operation of the corresponding actuator 32.

Thus, the opening and closing of each of the first, second, and third coolant distribution spaces 14a to 14c divided by the first and second distribution plates 18a and 18b is controlled by the angular rotation of the vanes 30.

For example, as shown in FIG. 4, in order to supply the highest amount of coolant to the unit cells at the side of the fuel cell stack opposite to the inlet of the fuel cell stack, the vanes 30 are angularly rotated downward such that the inlet of the third coolant distribution space 14c has the largest cross-sectional area. On the contrary, due to the downward angular rotation, the inlet of the first coolant distribution space 14a has the smallest cross-sectional area, and thus the smallest amount of coolant is distributed to the unit cells at the inlet side of the fuel cell stack.

As such, the angle of each of the coolant flow control vanes 30 is controlled to supply different amounts of coolant to the unit cells in the respective positions along the length of the fuel cell stack, and the coolant distribution control is repeated in a feedback manner (e.g., continuous feedback) until the temperature gradient over the whole set of unit cells of the fuel cell stack is within a predetermined variation.

Meanwhile, during cold start-up of the fuel cell stack, the temperature of the unit cells at the inlet side of the fuel cell stack and the unit cells at the side of the fuel cell stack opposite to the inlet of the fuel cell stack tends to rise more slowly than that of the unit cells in the middle of the fuel cell, and thus it is preferable to increase the amount of high temperature coolant to the unit cells at the inlet side of the fuel cell stack and the unit cells at the side of the fuel cell stack opposite to the inlet of the fuel cell stack.

To this end, as shown in FIG. 5, the upper vane 30 is angularly rotated downward and, at the same time, the lower vane 30 is angularly rotated upward such that the cross-sectional areas of the inlets of the first and third coolant distribution spaces 14a and 14c are increased and, at the same time, the cross-sectional area of the inlet of the second coolant distribution space 14b is reduced so as to supply a larger amount of high temperature coolant to the unit cells at the inlet side of the fuel cell stack and the unit cells at the side of the fuel cell stack opposite to the inlet of the fuel cell stack, thus improving cold startability.

As described above, the present invention provides the following effects.

Since the flow of coolant for the unit cells at the inlet side of the fuel cell stack, the unit cells in the middle of the fuel cell stack, and the unit cells at the side of the fuel cell stack opposite to the inlet of the fuel cell stack is differently distributed, it is possible to uniformly maintain the temperature distribution for the whole set of unit cells of the fuel cell stack.

In particular, it is possible to control and overcome the temperature variations that occur due to temperature degradation of the unit cells at the inlet side of the fuel cell stack and of the unit cells at the side of the fuel cell stack opposite to the inlet of the fuel cell stack, and the control and overcome the temperature variations that occur due to non-uniform flow of coolant.

Moreover, while various problems such as low power, flooding, durability degradation, cell separation, etc. occur due to overcooling of the unit cells caused by the temperature variation in the unit cells of the fuel cell stack, the present invention actively supplies an appropriate amount of coolant suitable to control the temperature of each unit cell, thus ensuring uniform power and improving the performance of the fuel cell stack.

Furthermore, it is possible to improve cold startability by supplying a larger amount of room temperature coolant to the unit cells in a low temperature range during cold start-up.

To this end, as shown in FIG. 5, the upper vane 30 is angularly rotated downward and, at the same time, the lower vane 30 is angularly rotated upward such that the cross-sectional areas of the inlets of the first and third coolant distribution spaces 14a and 14c are increased and, at the same time, the cross-sectional area of the inlet of the second coolant distribution spaces 14b is reduced so as to supply a larger amount of high temperature coolant to the unit cells at the inlet side of the fuel cell stack and the unit cells at the side of the fuel cell stack opposite to the inlet of the fuel cell stack, thus improving cold startability.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. An active thermal management system for a fuel cell stack, the system comprising:
   a plurality of distribution plates disposed in a coolant inlet manifold of the fuel cell stack and guiding a flow of coolant toward selected unit cells of a plurality of unit cells;
   a plurality of thermocouples, each thermocouple disposed in a corresponding unit cell selected from the plurality of unit cells to measure the temperature of the corresponding unit cell;
   a means for controllably distributing the flow of coolant differently to each of a plurality of coolant distribution spaces separated by the distribution plates disposed in the coolant inlet manifold or in a manifold interface, connected to the coolant inlet manifold; and
   a controller controlling a degree of opening of coolant distribution means based on measurement values of the thermocouples to control the distribution of flow of coolant to each of the plurality of coolant distribution spaces,
   wherein the distribution plates disposed in the coolant manifold comprise:
   a first distribution plate extending up to the unit cells at an inlet side of the fuel cell stack, and a second distribution plate extending further than the unit cells in the middle of the fuel cell stack and extending up to the unit cells at the side of the fuel cell stack opposite to the inlet of the fuel cell stack,
   wherein a first coolant distribution space for guiding the coolant toward the unit cells at the inlet side of the fuel cell stack is created between an inner bottom surface of the coolant inlet manifold and the first distribution plate, a second coolant distribution space for guiding the coolant toward the unit cells in the middle of the fuel cell stack is created between the first distribution plate and the second distribution plate, and a third coolant distribution space for guiding the coolant toward the unit cells at the side of the fuel cell stack opposite to the inlet of the fuel cell stack is created between the second distribution plate and the upper surface of the coolant inlet manifold, and
   wherein each thermocouple is connected to a thermocouple well connected to the corresponding unit cell of the fuel cell stack, and the thermocouples are provided more densely among the unit cells at the inlet side of the fuel cell stack and among the unit cells at the side of the fuel cell stack opposite to the inlet of the fuel cell stack than among the unit cells in the middle of the fuel cell stack.

2. The system of claim 1, wherein the means for controllably distributing the flow of coolant comprises:
   a plurality of guide plates disposed in the manifold interface, wherein each guide plate of the plurality is connected to a corresponding distribution plate in the coolant inlet manifold, and
   a plurality of flow control valves, wherein each flow control valve is disposed in a corresponding coolant guide space separated by the guide plates, and wherein the degree of opening of each flow control valve is controlled by the controller.

3. The system of claim 1, wherein the means for controllably distributing the flow of coolant comprises:
   an actuator disposed in a position where the coolant inlet manifold and the manifold interface are connected, and
   a vane angularly rotatably mounted on the actuator to control the opening and closing of one of the coolant distribution spaces separated by the distribution plates.

4. The system of claim 1, wherein the controller performs coolant distribution control for controlling the degree of opening of the means for controllably distributing the flow of coolant, and the coolant distribution control is repeated in a feedback manner until a temperature gradient over the unit cells of the fuel cell stack is within a predetermined variation.

* * * * *